No. 656,920. Patented Aug. 28, 1900.
L. C. YOUNG.
CULTIVATOR.
(Application filed June 28, 1900.)

(No Model.) 2 Sheets—Sheet 1.

Witnesses:
E. D. Kesler
W. Lee Helm

Inventor
Lawrence C. Young
By James L. Norris
Atty

THE NORRIS PETERS CO., PHOTO-LITHO., WASHINGTON, D. C.

No. 656,920.  
L. C. YOUNG.  
CULTIVATOR.  
(Application filed June 28, 1900.)  
Patented Aug. 28, 1900.
(No Model.)  
2 Sheets—Sheet 2.
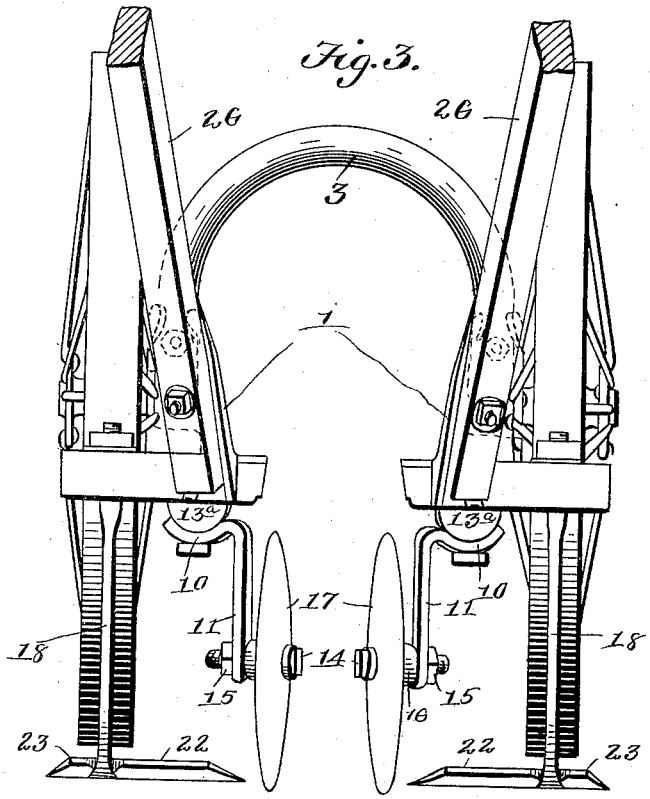
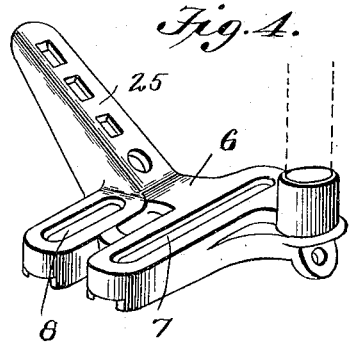
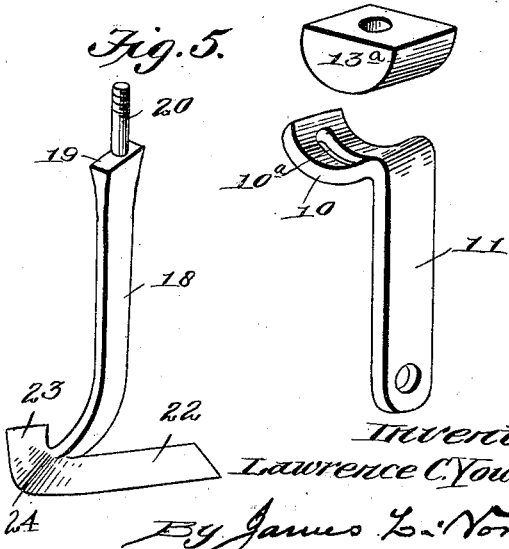
Witnesses:  
C. D. Kesler  
W. Lee Helmer
Inventor  
Lawrence C. Young.  
By James L. Norris.  
Atty.

UNITED STATES PATENT OFFICE.

LAURENCE C. YOUNG, OF GOOSE CREEK, KENTUCKY.

CULTIVATOR.

SPECIFICATION forming part of Letters Patent No. 656,920, dated August 28, 1900.

Application filed June 28, 1900. Serial No. 21,929. (No model.)

*To all whom it may concern:*

Be it known that I, LAURENCE C. YOUNG, a citizen of the United States, residing at Goose Creek, in the county of Jefferson and State of Kentucky, have invented new and useful Improvements in Cultivators, of which the following is a specification.

This invention relates to cultivators, and especially to that class of wheeled cultivators adapted to be pushed by hand for cultivating small growing plants, wherein hoes or cultivator-blades carried by a wheeled frame are arranged to straddle the row of plants and operate to cut beneath the surface of the soil to chop off the weeds and undesirable growth and loosen up the soil, in combination with fenders carried by said frame and also straddling the row of plants, said fenders operating to prevent the hoes or cultivator-blades from cutting the roots or otherwise injuring the plants and serving as guides to indicate to the operator how close the hoes or cultivator-blades are running to the roots of the plants.

The invention has for one object to provide a machine of the character referred to which will be simple, durable, and inexpensive in construction and efficient and easily managed in operation.

It also has for its object to provide such a machine with improved rotary-disk fenders adapted to be adjusted toward and from the plants and also capable of being adjusted at different angles to the line of draft.

It has for a further object to provide improved hoes or cultivator-blades adjustable toward and from the plants independently of the rotary-disk fenders; and finally it has for its object to improve and simplify the construction and render more thorough and efficient the operation of this class of machines generally.

To these ends my invention consists in the features and in the construction, combination, and arrangement of parts hereinafter described, and particularly pointed out in the claims following the description, reference being had to the accompanying drawings, forming a part of this specification.

Figure 1:
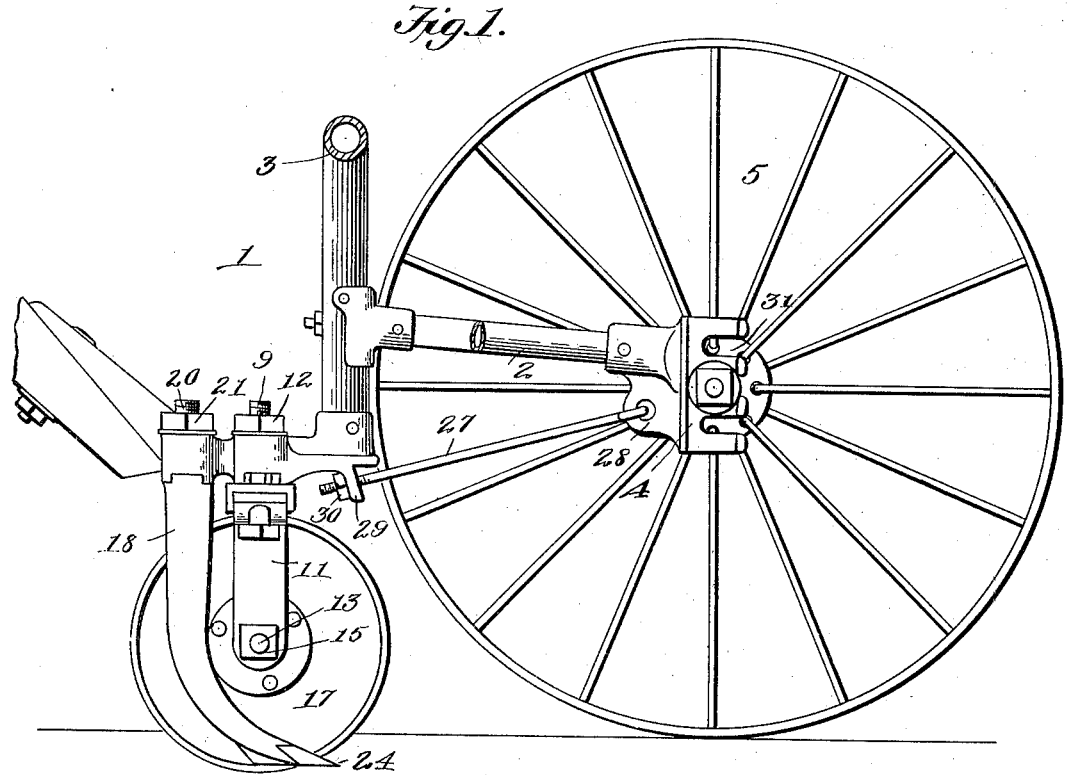
Figure 2:
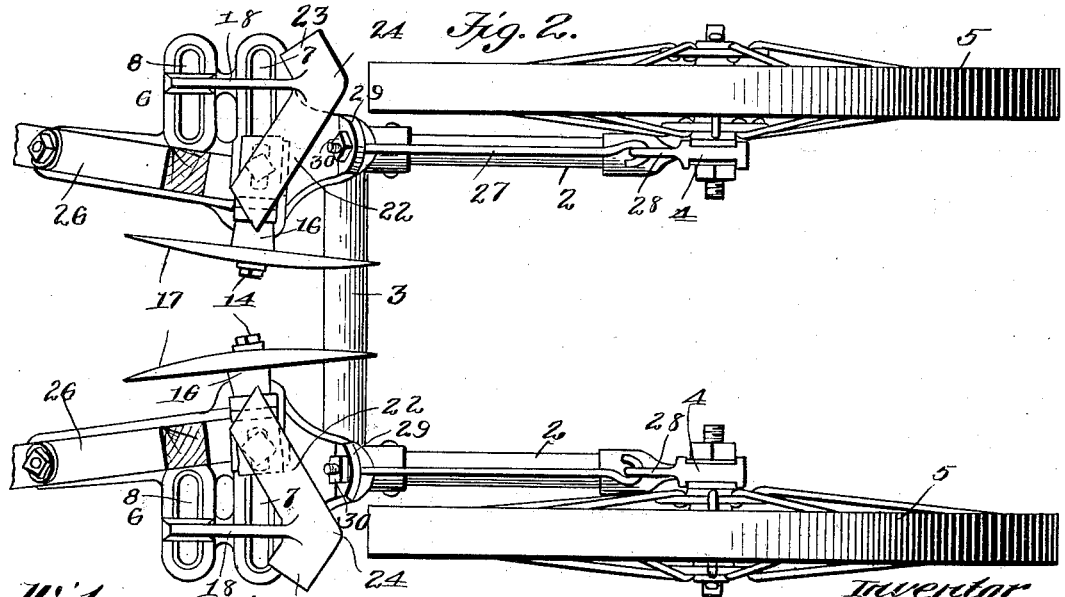

Figure 1 is a sectional side elevation of my improved cultivator. Fig. 2 is a bottom plan view thereof. Fig. 3 is a view in rear elevation. Fig. 4 is a detail perspective view of one of the brackets in which the hoes and disk fenders are adjustably supported. Fig. 5 is a similar view of one of the hoes, and Fig. 6 is a similar view of one of the disk-fender-supporting arms and its bearing-block.

Referring to the drawings, the numeral 1 indicates a yoke-frame comprising two parallel longitudinal tubular beams 2, held a fixed distance apart by an arched yoke 3 and provided at their forward ends with suitable bearings or journal-boxes 4, in which are journaled ground-wheels 5.

To the lower ends of the yoke 3 are bolted horizontal brackets 6. Each of the brackets 6 has formed therein two transverse elongated slots 7 and 8, disposed parallel to one another and extending entirely through the brackets. Passing through the slots 7 are headed bolts 9. The lower headed ends of said bolts pass through curved flanges 10, formed on the upper ends of pendent arms 11, and the upper ends, which project above the brackets, have secured thereover nuts 12, by means of which the bolts are held immovable in the slots.

Fitted on the lower ends of the bolts 9, between the curved flanges 10 and the under sides of the brackets, are approximately-semicircular blocks 13$^a$, their curved sides fitting the curvature of the flanges 10. The curved flanges 10 are each provided with an elongated slot 10$^a$ for the purpose hereinafter made apparent. In the lower end of each of the pendent arms 11 is fixed a transverse bolt or journal 13, said bolts or journals having heads 14 formed on their inner or adjacent ends and having nuts 15 screwed on their outer or opposite ends. Journaled on each of said bolts or journals between the pendent arm and the head 14 is a hub 16, having bolted thereto a concavo-convex disk 17. The said disks have sharpened edges or peripheries, and in the example shown in the drawings are so arranged that their concave sides face outward, while their convex sides are arranged adjacent to one another. The disks 17 are free to rotate on the journals 13 and constitute rotary-disk fenders which operate in the manner hereinafter explained.

Adjustably arranged in the slots 8 are the hoes or cultivator-blades, constructed as follows: The numeral 18 indicates a vertical and forwardly-curved standard provided near its upper end with a shoulder 19, adapted to abut the under side of the bracket on each side of the slot 8 and provided with a threaded shank or extension 20, which projects through said slot and has screwed on its upper end a nut 21, which operates to hold said standard fixed to the bracket. Formed integrally with the lower end of the standard is the hoe or cultivator-blade, comprising a thin flat horizontal blade 22, that projects horizontally rearward from the standard at an angle toward the corresponding disk fender, and at its forward end is provided with a short laterally-projecting blade 23, that is disposed at an angle to the blade 22 and extends outwardly and rearwardly, as shown, the two blades 22 and 23 at their forward meeting ends terminating in a sharp point 24. It will be understood that two such hoes or cultivator-blades are provided, one on the outer side of each of the rotary-disk fenders.

Formed on the rear edges of the brackets 7 are tongues 25, that project upward and rearward at an angle, and to said tongues are bolted the handles 26. The brackets are preferably braced to the beams 2 by brace-rods 27, the forward ends of which are hooked in eyes 28 on the forward ends of the beams, and the rear ends are threaded and pass through perforated lugs 29, formed on the under side of the brackets, nuts 30 being screwed over the rear threaded ends of said brace-rods and operating to strain the latter and render the brackets rigid.

The operation of my improved cultivator is as follows: The operator grasps the handles 26 and pushes the machine in front of him in such manner that the rotary-disk fenders and the hoes or cultivator-blades straddle the row of plants. As shown, the rotary-disk fenders are so arranged that they incline toward each other at their forward edges, or, in other words, they are so arranged relatively to each other that their outer concave sides or faces are disposed obliquely toward the line of draft. The hoes or cultivator-blades are arranged horizontally on the outer sides of the disk fenders. As the machine is propelled over the row of plants the horizontal hoes or cultivator-blades travel beneath the surface of the soil and cut down the weeds and undesirable growth at their roots on both sides of the plant and also loosen up the soil. The rotary-disk fenders cut the ridge left around the plant away from the earth on both sides of the ridge and throw the earth loosened by the hoes or cultivator-blades away from the plants and prevent the loosened soil, clods, and the weeds and vines from falling back on the plants. In other words, they prevent the earth from falling on the plants as the hoes or cultivator-blades are passing the latter, and they also throw the earth away from the plants sufficiently to prevent it from falling back onto the plants after the hoes or cultivator-blades have passed the latter. The disk fenders also serve as guides to show the operator just how close the hoes or cultivator-blades are running to the roots of the plants, though the hoes or blades are entirely concealed from view beneath the surface of the soil. By loosening the nuts 12 the disk fenders may be adjusted toward and away from each other to enable them to run closer to or farther away from the plants, and the arms 11, which are swiveled on the bolts 10, when the latter are loose, may be turned on the bolts so as to adjust the disk fenders at any desired angle to the line of draft. After the disk fenders have been adjusted in the manner described the nuts 12 are tightened up, firmly holding the disk fenders in their adjusted positions. In like manner the hoes or cultivator-blades may be adjusted laterally toward and away from each other by loosening the nuts 21.

I have shown and described the machine as being propelled entirely by hand; but it will be evident that the same may be operated by horse-power or the like.

When the disk fenders are adjusted in the manner above described, they operate to throw the earth away from the plants; but by turning the arms 11 about the bolts 9 as centers the disks may be adjusted so as to converge toward one another at their rear edges, whereupon they will operate to throw the earth toward the plants. Furthermore, the disk fenders may be reversed—that is to say, they may be arranged with their concave sides innermost or toward each other—and by loosening the bolts 12 may be adjusted toward and from one another and at any desired angle to the line of draft. The disks are also capable of a still further and very important adjustment. As shown, the curved flanges 10 of the arms 11, carrying the disks, correspond to the curvature of the blocks 13ª, and by providing the flanges 10 with the elongated slots 10ª it will be evident that on loosening the nuts 12 the arms 11 may be rocked on the bearing-blocks 13ª, so as to adjust or incline the disks at any desired angle toward one another and to the plants—that is to say, said disks may be adjusted at any desired angle to the perpendicular. For example, when the plants have large leaves the disks may be so adjusted that while their lower edges are relatively close to one another their upper edges will be considerably farther apart. Such an adjustment of the disks affords the operator an unobstructed view of the plants, while at the same time permitting the disks to be run close to the base of the plants. Again, the disks may be set parallel to the line of draft and then act solely as fenders. After the plants are large enough the disks can be entirely removed from the brackets and the cultivator-hoes alone used, and in such case the hoes may be reversed or interchanged, so that the short blades 23 will be innermost or adjacent to one another, and when so adjusted the shanks of the hoes will indicate to the operator just how close the blades of the hoes are running to the plants.

I have shown the bearings 4 provided with a plurality of bearing-slots 31, arranged one above the other, so that the axle of the ground-wheels may be adjusted in any corresponding two of said slots, and thereby alter the inclination of the cultivator-shovels to control the depth of their penetration.

Having described my invention, what I claim is—

1. In a cultivator, the combination with a wheeled frame, of two rotary-disk fenders arranged to straddle a row of plants, means for adjusting the angle of said disk fenders relatively to the line of draft, hoes or cultivator-blades arranged opposite the outer sides of said disk fenders, and means for laterally adjusting said hoes or blades toward and from the outer sides of the disk fenders and rigidly fixing them in their adjusted position, substantially as described.

2. In a cultivator, the combination with a wheeled frame, of two rotary-disk fenders arranged to straddle a row of plants, means for adjusting the angle of said disk fenders relatively to the line of draft and for adjusting them laterally toward and from each other, hoes or cultivator-blades arranged opposite the outer sides of said disk fenders, and means for laterally adjusting said hoes or blades toward and from the outer sides of the disk fenders and rigidly fixing them in their adjusted position, substantially as described.

3. In a cultivator, the combination with a wheeled frame, of two concavo-convex rotary-disk fenders arranged to straddle a row of plants, means for adjusting said disk fenders laterally toward and from each other and for adjusting the angle of said disk fenders in such manner as to present either side thereof to the line of draft whereby the earth may be thrown either toward or from the plants, hoes or cultivator-blades adjustable toward and from the outer sides or faces of the disk fenders, and means for rigidly fixing said hoes or blades in their adjusted positions, substantially as described.

4. In a cultivator, the combination with a wheeled frame, of two disk fenders arranged to straddle a row of plants, means for adjusting said disk fenders at varying angles to a perpendicular position, and hoes or cultivator-blades arranged opposite the outer sides or faces of the disk fenders, substantially as described.

5. In a cultivator, the combination with a wheeled frame, provided with suitable brackets, of rigid pendent arms each carrying a rotary-disk fender at its lower end and provided at its upper end with a laterally-projecting and slotted curved flange, headed bolts passing through said slotted flanges and through the brackets, and approximately-semicircular bearing-blocks fitted on the bolts between the curved flanges and brackets, whereby said disk fenders may be adjusted at varying angles to a perpendicular position, substantially as described.

6. In a cultivator, the combination with a wheeled frame provided with suitable laterally-slotted brackets, of rigid pendent arms each carrying a rotary-disk fender at its lower end and provided at its upper end with a laterally-projecting and slotted curved flange, headed bolts passing through said slotted flanges and through the slotted brackets, approximately-semicircular bearing-blocks fitted on the bolts between the curved flanges and brackets, and nuts screwed on the bolts above the brackets, the arrangement being such that by loosening the nuts the disks may be adjusted at varying angles to a vertical position, at different angles to the line of draft and toward and from each other, and may be rigidly fixed in their several adjusted positions by tightening up said nuts, substantially as described.

In testimony whereof I have hereunto set my hand in presence of two subscribing witnesses.

LAURENCE C. YOUNG.

Witnesses:
BURWELL K. MARSHALL,
A. M. DOLD.